United States Patent
Milton et al.

(10) Patent No.: US 12,265,708 B2
(45) Date of Patent: Apr. 1, 2025

(54) TIMING ALIGNMENT FOR DATA STRUCTURE READ COMMANDS

(71) Applicant: VIAVI Solutions Inc., Chandler, AZ (US)

(72) Inventors: Jonathan Milton, St. Albans (GB); Tong Liew, Chelmsford (GB)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/342,131

(22) Filed: Jun. 27, 2023

(65) Prior Publication Data

US 2025/0004643 A1    Jan. 2, 2025

(51) Int. Cl.
G06F 3/06    (2006.01)

(52) U.S. Cl.
CPC .......... G06F 3/0611 (2013.01); G06F 3/0659 (2013.01); G06F 3/0673 (2013.01)

(58) Field of Classification Search
CPC ..... G06F 3/0611; G06F 3/0659; G06F 3/0673
See application file for complete search history.

(56) References Cited

U.S. PATENT DOCUMENTS

| | | | |
|---|---|---|---|
| 2014/0013187 A1 | 1/2014 | Blaunstein | |
| 2017/0285998 A1* | 10/2017 | Mathuria | G11C 8/12 |
| 2018/0095661 A1 | 4/2018 | Ananthanarayanan et al. | |
| 2018/0293191 A1 | 10/2018 | Li | |
| 2022/0137870 A1* | 5/2022 | Yamamoto | G11C 7/1063 711/154 |

OTHER PUBLICATIONS

Extended European Search Report for European Application No. EP241834787 dated Nov. 12, 2024, 14 pages.

* cited by examiner

*Primary Examiner* — Jason W Blust
(74) *Attorney, Agent, or Firm* — Harrity & Harrity, LLP

(57) ABSTRACT

In some implementations, an integrated circuit may receive a read command associated with a data structure of the integrated circuit. The integrated circuit may determine that requested data, of the data structure and associated with an element within the data structure, is not ready for reading. The integrated circuit may output, based on determining that the requested data is not ready for reading, generated delay data. The integrated circuit may determine that the requested data, of the data structure and associated with the element, is ready for reading. The integrated circuit may output, based on determining that the data is ready for reading, the requested data.

20 Claims, 6 Drawing Sheets

TIMING ALIGNMENT FOR DATA STRUCTURE READ COMMANDS

BACKGROUND

A host device may include an embedded component that is disposed in a common packaging and/or on a common substrate to perform one or more functionalities for the host device. For example, a testing device may include a field programmable gate array (FPGA) that performs one or more configurable functions for the testing device. The embedded device may read data from a remote memory and pass contents of the data to a processor of the host device. For example, the embedded device may read startup configuration data, based on a read command from the host device, and may provide the startup configuration data to the host device to enable the host device to perform one or more startup operations.

SUMMARY

Some implementations described herein relate to a method. The method may include receiving, by an integrated circuit, a read command associated with a data structure of the integrated circuit. The method may include determining, by the integrated circuit, that requested data, of the data structure and associated with an element within the data structure, is not ready for reading. The method may include outputting, by a multiplexer of the integrated circuit and based on determining that the requested data is not ready for reading, generated delay data. The method may include determining, by the integrated circuit, that the requested data, of the data structure and associated with the element, is ready for reading. The method may include outputting, by the multiplexer of the integrated circuit and based on determining that the data is ready for reading, the requested data.

Some implementations described herein relate to a field programmable gate array (FPGA). The field programmable gate array may include one or more memories and one or more processing components coupled to the one or more memories. The one or more processing components may be configured to receive a read command associated with a data structure of the FPGA. The one or more processing components may be configured to determine that requested data, associated with an element within the data structure, is not ready for reading. The one or more processing components may be configured to output, based on determining that the requested data is not ready for reading, generated delay data. The one or more processing components may be configured to determine that the requested data, of the data structure and associated with the element, is ready for reading. The one or more processing components may be configured to output, based on determining that the data is ready for reading, the requested data.

Some implementations described herein relate to a host device. The host device may include one or more memories and one or more processors coupled to the one or more memories. The one or more processors may be configured to transmit a read command associated with a data structure of an integrated circuit, wherein the read command is associated with an element within the data structure. The one or more processors may be configured to receive first data as a response to the read command, the first data including generated delay data. The one or more processors may be configured to read the first data based on receiving the first data. The one or more processors may be configured to determine, based on reading the first data, that the first data is the delay data. The one or more processors may be configured to delay performing a processing action in connection with the read command based on determining that the first data is the delay data. The one or more processors may be configured to receive second data, after receiving the first data, as another response to the read command, the second data including requested data associated with the element within the data structure.

DETAILED DESCRIPTION

Figure 1:
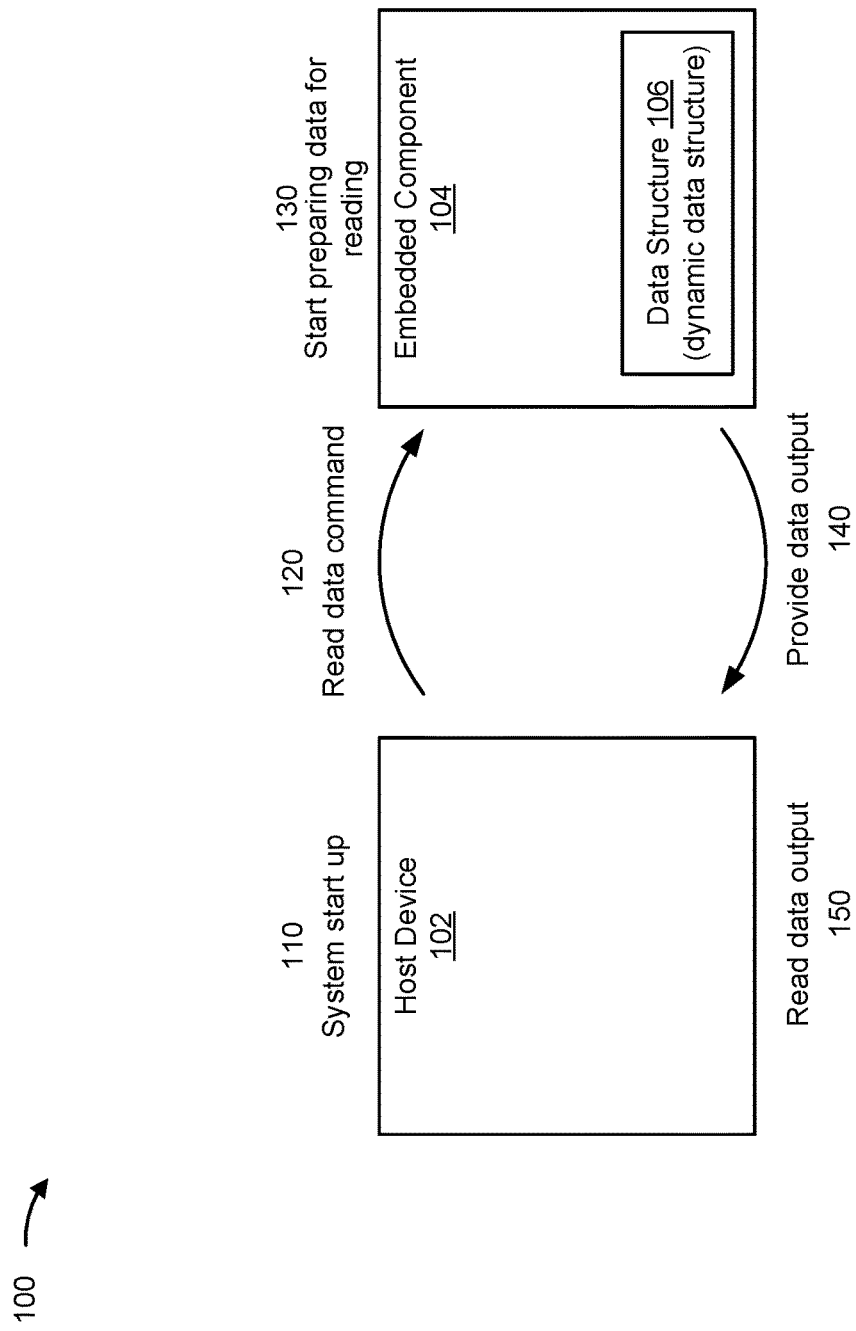
FIG. 1 is a diagram of an example implementation associated with timing alignment for data structure read commands.

The following detailed description of example implementations refers to the accompanying drawings. The same reference numbers in different drawings may identify the same or similar elements.

A host device, such as a host central processing unit (CPU) of a system, may be associated with one or more embedded components. For example, the host device may have an integrated circuit (IC), such as a field programmable gate array (FPGA), attached to the host device to provide one or more functionalities for the host device. The embedded component may have one or more processing components and/or one or more memory components. For example, the embedded component may be associated with a remote memory and may use a processing component to read the remote memory as a response to receiving a command (e.g., a read command).

However, a speed at which the embedded component reads the remote memory and is able to pass contents of the remote memory to a processor (e.g., of the host device) may be less than a threshold speed. As a result, data, from the remote memory, may not be available to be read for a threshold period of time after a read command. The host device and the embedded component may lack time synchronization information. As a result, the embedded component may not be able to transmit a delay command indicating a particular amount of time for the host device to wait before requested data will be ready for the host device to read. The embedded component and the host device may implement a polling functionality, in which the embedded component sets a polling bit to indicate whether data is ready for reading. The host device may communicate with the embedded component, periodically, to determine a status of the polling bit and whether the data is ready for reading. However, implementing a polling functionality may require customization of hardware, firmware, or software of the host device and/or the embedded component, which may limit deployment flexibility. Additionally, or alternatively, when a periodicity of checking the polling bit is relatively long, a latency between the data being ready and the host device reading the data may also be high.

Some implementations described herein enable an embedded component to generate delay data during a period of time when requested data is not ready to fulfill a read command. For example, an embedded component may receive a request to read data from a dynamic data structure and may generate delay data that the host device can read until requested data is available for the host device to read. In this case, a processor of the host device reads data from the embedded component in chunks (e.g., groups of bits of a configured size), with each chunk having an instruction indicating, to the processor, a purpose of the chunk (e.g., how the chunk is to be processed) and/or a size of a next chunk. Based on the delay data indicating that the delay data is of a delay data type (e.g., the chunk is to be discarded) and indicating another chunk for reading, the processor of the host device can continue reading the delay data until the requested data is ready. In other words, the delay data includes chunks of bits that include an instruction to do nothing except read more data (e.g., a next chunk, which may be more delay data or may include requested data once the requested data is ready).

When the requested data is ready, a multiplexing component of the embedded component can switch from a first data stream of delay data to a second data stream of requested data, thereby providing a response to the read command. In this way, the embedded component enables reading of data from a dynamic data structure without the embedded component or the host device having software to implement use of a polling bit. By obviating a need for a polling bit, the embedded component reduces data storage requirements (e.g., by freeing up the polling bit for another purpose) and reduces a latency associated with providing data by obviating the need for periodic checking of the polling bit, which can cause read delays.

FIG. 1 is a diagram of an example implementation 100 associated with timing alignment for data structure read commands. As shown in FIG. 1, example implementation 100 includes a host device 102 and an embedded component 104. These devices are described in more detail below in connection with FIG. 3.

As further shown in FIG. 1, and by reference numbers 110 and 120, the host device 102 may initiate a system start up procedure and may transmit a read data command to the embedded component 104. For example, when the host device 102 is powered on, the host device 102 may initiate a startup sequence, which may include reading data from a remote memory (e.g., the data structure 106) associated with the embedded component 104. The embedded component 104 may receive the read data command and may prepare data for reading, as shown by reference number 130. For example, a processing component of the embedded component 104 may determine a register address or register location within the data structure 106, based on the read data command (e.g., which may convey an identifier of the register address), and may attempt to output requested data from a portion of the data structure 106 associated with the register address. In this case, the embedded component 104 may determine that the requested data is not ready for reading. For example, when a read speed for outputting data from the data structure 106 is relatively slow (e.g., relative to a read speed for reading data by a processor of the host device 102), the embedded component 104 may determine that there is a period of time in which the requested data from the data structure 106 is not available to be output to the host device 102. In this case, as described in more detail below, the embedded component 104 may generate delay data. For example, the embedded component 104 may generate a data stream of delay data that is of the same format as data from the data structure 106. In some implementations, the embedded component 104 may maintain information identifying a position within the data structure 106 (e.g., a next bit that is to be read).

In some implementations, the data stream of delay data may be associated with a dynamic data structure format, in which chunks of data include indicators of a next chunk of data to read. For example, the embedded component 104 may generate chunks of delay data that include an indication of how to process the delay data (e.g., an indication to not process the delay data) and/or an indication of a next chunk of data to read. Additionally, or alternatively, the embedded component 104 may include a different type of data structure (e.g., other than a dynamic data structure). For example, the embedded component 104 may include a static data structure. Additionally, or alternatively, the embedded component 104 may include a linked list data structure. In this case, the data stream of delay data may include generated linked list elements, each of which may include a blank set of data for the host device 102 to read (and discard) and a pointer to a next element of the linked list (e.g., which may be another delay data linked list element or which may be a requested data linked list element when the requested data is ready).

As shown by reference numbers 140 and 150, the embedded component 104 may provide data output and the host device 102 may read the data output. For example, during a first period of time (e.g., when the requested data is not ready for reading), the embedded component 104 may provide delay data as output. In this case, the delay data may include a set of bits that the host device 102 can read and discard. For example, the delay data may include an indicator that the delay data is a delay data type and is to be discarded rather than read as substantive data. Additionally, or alternatively, the delay data may include an indicator of a next chunk of data to read, which may cause the host device 102 to continue to read subsequent chunks of delay data. When the first period of time has elapsed and a second period of time has started (e.g., when the requested data is ready for reading), the embedded component 104 may switch the data output to the requested data. In this case, the requested data may include an indicator that the requested data is not a delay data type and is to be processed rather than discarded as delay data. Additionally, or alternatively, the requested data may include an indicator of a next chunk of data to read, which may cause the host device 102 to continue to read subsequent chunks of requested data. In this way, by providing delay data for the first period of time, the embedded component 104 maintains a processor of the host device 102 as active until the requested data is available for the processor of the host device 102 to read. In other words, the embedded component 104 dynamically alters the size and structure of data being read out and provided to the host device 102 (e.g., by generating a set of delay bits) so that a processor of the host device 102 does not complete a read operation until the requested data has been provided (and is read by the host device 102). Additionally, or alternatively, by using the delay data, the embedded component 104 obviates a need for a polling bit to indicate whether requested data is ready for reading.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
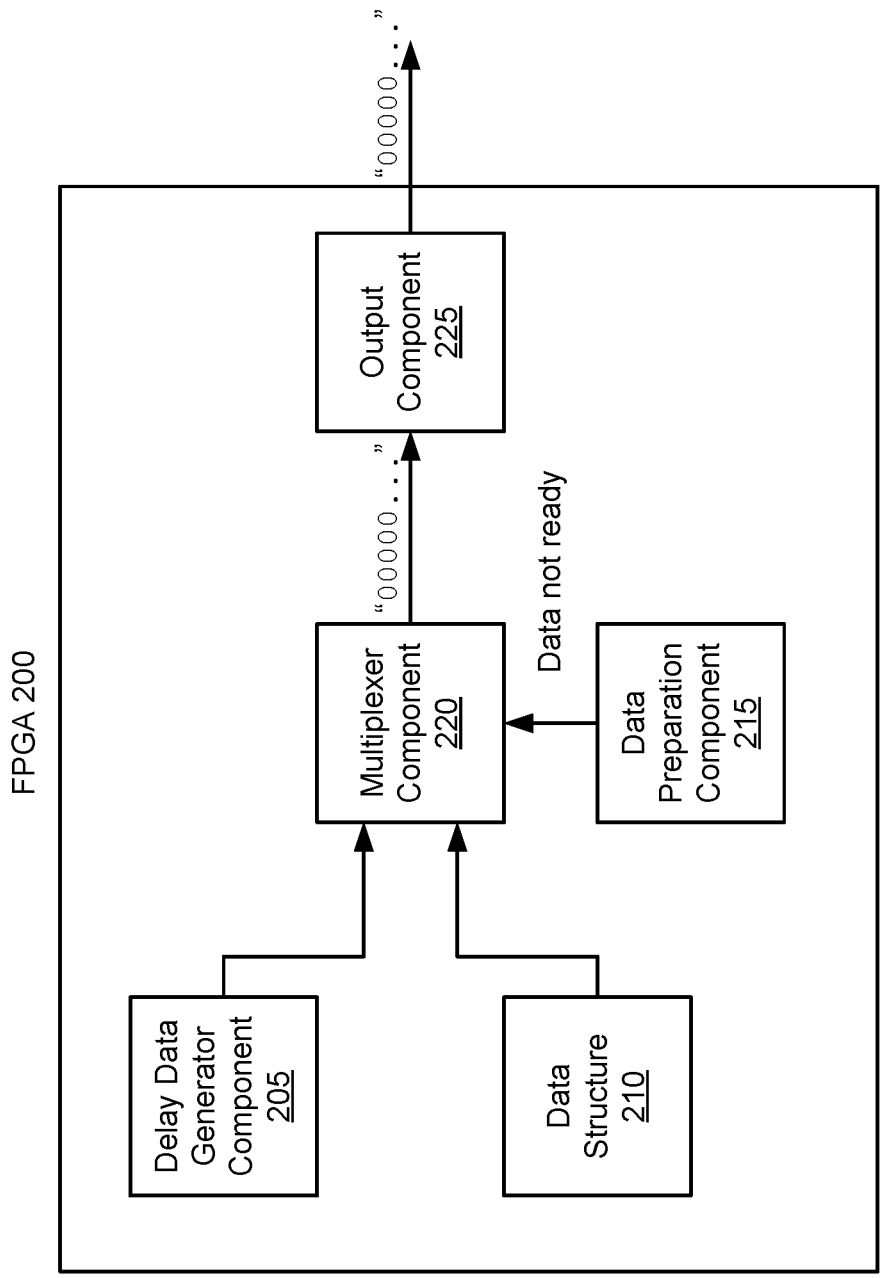
FIGS. 2A-2C are diagrams of an example associated with timing alignment for data structure read commands.
Figure 2B:
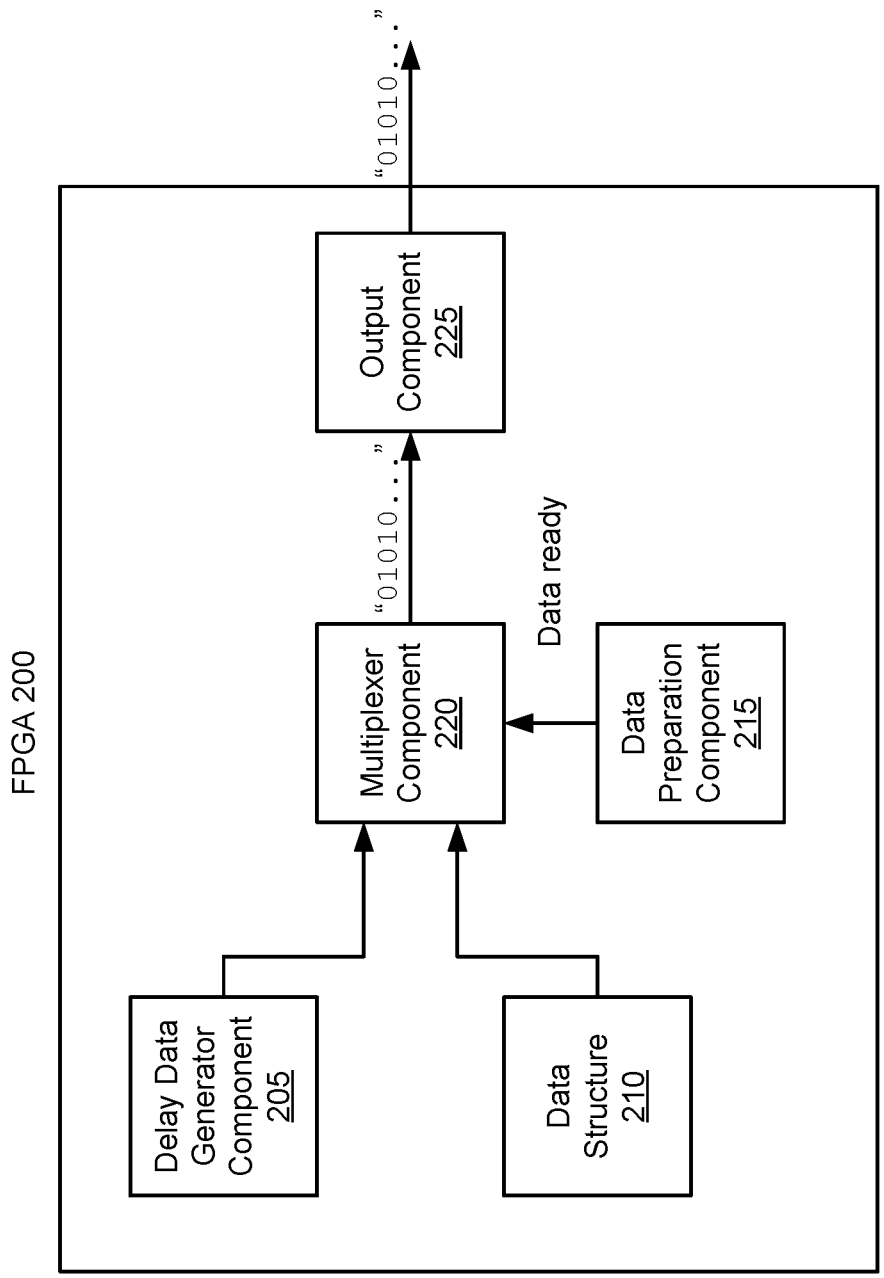
Figure 2C:
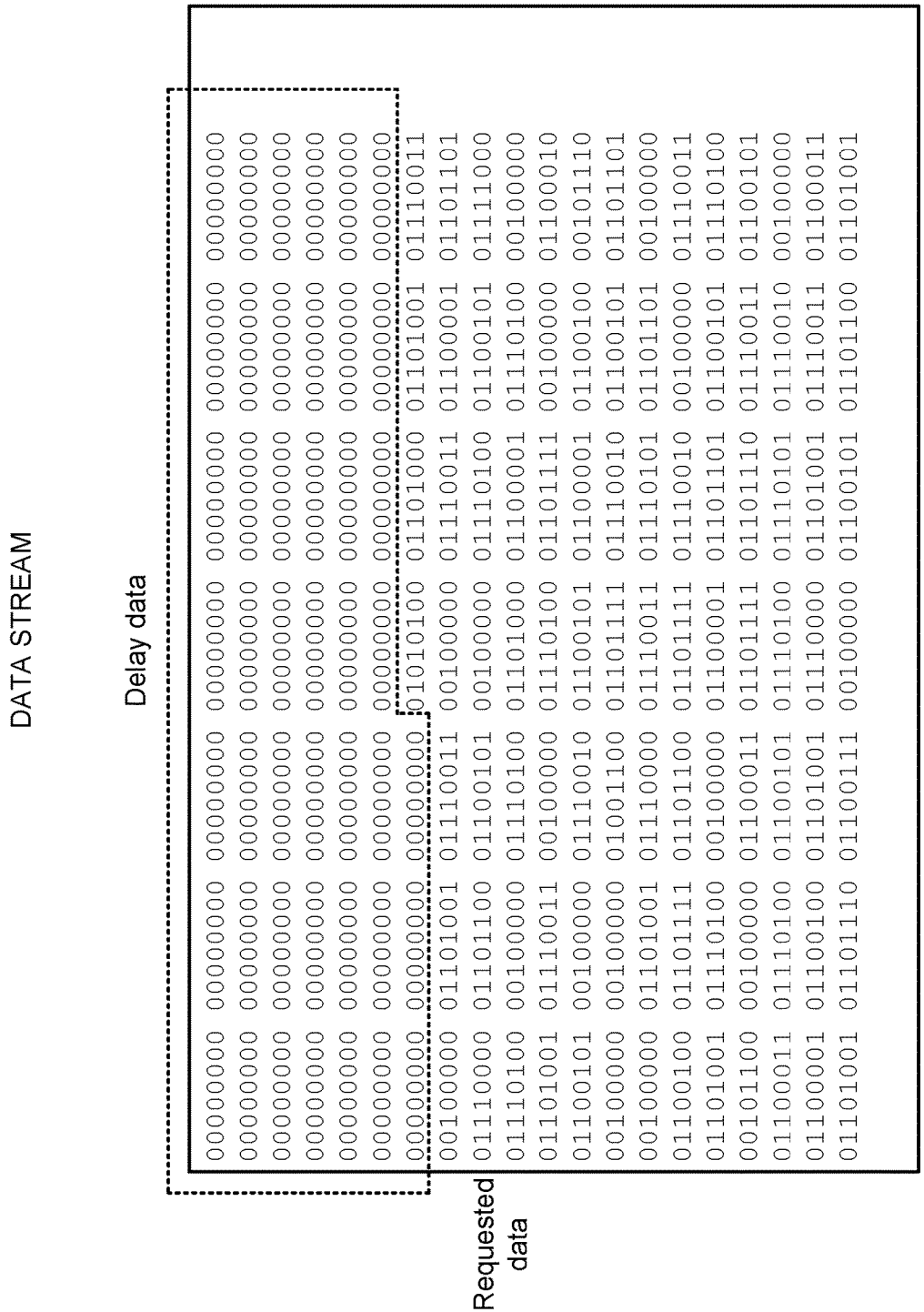

FIGS. 2A-2C are diagrams of an example associated with timing alignment for data structure read commands. As shown in FIGS. 2A-2C, the example includes an FPGA 200, which may correspond to the embedded component 104 described above in connection with FIG. 1. These devices are described in more detail below in connection with FIG. 3.

As shown in FIG. 2A, the FPGA 200 includes a delay data generator component 205, a data structure 210, a data preparation component 215, a multiplexer component 220, and/or an output component 225, among other examples. When the FPGA 200 receives a read command (which may or may not include information identifying an element within the data structure 210) to read data from the data structure 210, the FPGA 200 may use the data preparation component 215 to access the data structure 210 and read data out of a register address in the data structure 210. In some implementations, the data preparation component 215 may indicate that the data is not ready for output by the output component 225. For example, the data preparation component 215 may indicate that requested data from the data structure 210 is delayed by a period of time associated with a read speed of the data structure 210. In some implementations, the data preparation component 215 may determine that data is not ready for output based at least in part on a status of the data structure 210. For example, when the FPGA 200 receives a pointer to a register address in the data structure 210, the FPGA 200 may read a word out of the data structure 210 and advance a pointer to a next address in the data structure 210. In this case, when advancing to the next address in the data structure 210, the FPGA 200 may be delayed in attempting to read a next word at the next address as a result of a refresh speed of the data structure 210.

The multiplexer component 220 may switch from passing through a first data stream from the data structure 210 to passing through a second data stream from the delay data generator component 205. For example, the delay data generator component 205 may generate delay data, such as a set of zeros ("0000 . . . "), and provide the delay data to the multiplexer component 220. The multiplexer component 220 may output the delay data to the output component 225, which may output the delay data from the FPGA 200 (e.g., to a host device processor).

In some implementations, the delay data generator component 205 may generate a continuous set of zeros as delay data. For example, the delay data generator component 205 may generate sets or chunks of zeroes sequentially while delay data is being provided as output. Additionally, or alternatively, the delay data generator component 205 may loop a set of bits rather than generating new bits. For example, rather than generate a particular quantity of bits for output, the delay data generator component 205 may generate a set of bits and an indicator to provide multiple instances of the set of bits as output or to read the set of bits repeatedly at a host device. In this way, the delay data generator component 205 may reduce an amount of delay data that is generated to achieve a particular period of delay.

Additionally, or alternatively, the delay data generator component 205 may provide another format of delay data (e.g., that a host device is configured to interpret as delay data), such as providing ones sequentially as delay data. Additionally, or alternatively, the delay data generator component 205 may provide a combination of zeroes and ones as delay data (e.g., in a configured pattern that a host device can recognize as delay data). In some implementations, the delay data generator component 205 may generate delay data to achieve a particular functionality. For example, the delay data generator component 205 may generate delay data to convey a payload. In this case, the delay data may include information that is provided to a host device, other than the requested data, that the host device can use for a configured purpose, such as providing status data, hardware identification data, or some other data that is available for output.

In some implementations, the delay data generator component 205 may provide delay data indicating that the host device is to perform another task. For example, the delay data generator component 205 may provide delay data that is interpretable by the host device as indicating that the requested data is delayed for a particular period of time. In this case, the host device can switch to another processing task for the particular period of time before returning to reading data from the FPGA 200. In some implementations, the FPGA 200 (and a host device) may use respective tables to store information identifying combinations of bits and associated interpretations (e.g., a particular string of bits being interpreted as a delay of a particular period of time).

In some implementations, the delay data generator component 205 may provide delay data that is data relating to a different request. For example, when the FPGA 200 receives a first command requesting first data and a second command requesting second data, but the first data is unavailable for a period of time, the FPGA 200 may multiplex the second data as delay data until the first data is available. In this case, when the first data becomes available, the FPGA 200 may switch from providing the second data (as delay data) to providing the first data (as requested data). After the first data is completed, the FPGA 200 may return to providing the second data. Similarly, the FPGA 200 may provide delay data after providing requested data. For example, the FPGA 200 may receive a request for data and may start providing the data as requested data. In this case, after a period of time, the FPGA 200 may determine to pause providing the requested data, and may provide delay data for a period of time until the FPGA 200 can return to providing the requested data. Examples of scenarios in which the FPGA 200 may pause providing requested data may include the requested data becoming unavailable (e.g., as a result of a buffer status), a higher priority request for data being received at the FPGA 200, a heating condition (e.g., where the FPGA 200 is overheated and stops reading the data structure 210 until the heating condition has abated), or another scenario. In such scenarios, the FPGA 200 may execute one or more pauses (e.g., the FPGA 200 may switch between providing delay data and requested data multiple times until all of the requested data is provided).

As shown in FIG. 2B, after a period of time in which the requested data is not ready for reading, the data preparation component 215 may determine that the requested data is ready for reading. For example, the data preparation component 215 may indicate, to the multiplexer component 220, to switch from passing through the second data stream with delay data to passing through the first data stream with requested data. In this case, the multiplexer component 220 passes through the first data stream with the requested data ("01010 . . . ") to the output component 225, which may output the requested data from the FPGA 200 (e.g., to a host device processor). From the perspective of the output component 225 (and the host device processor), there is a single data stream that includes a first portion, which is delay data, and a second portion, which is requested data, as shown in FIG. 2C.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
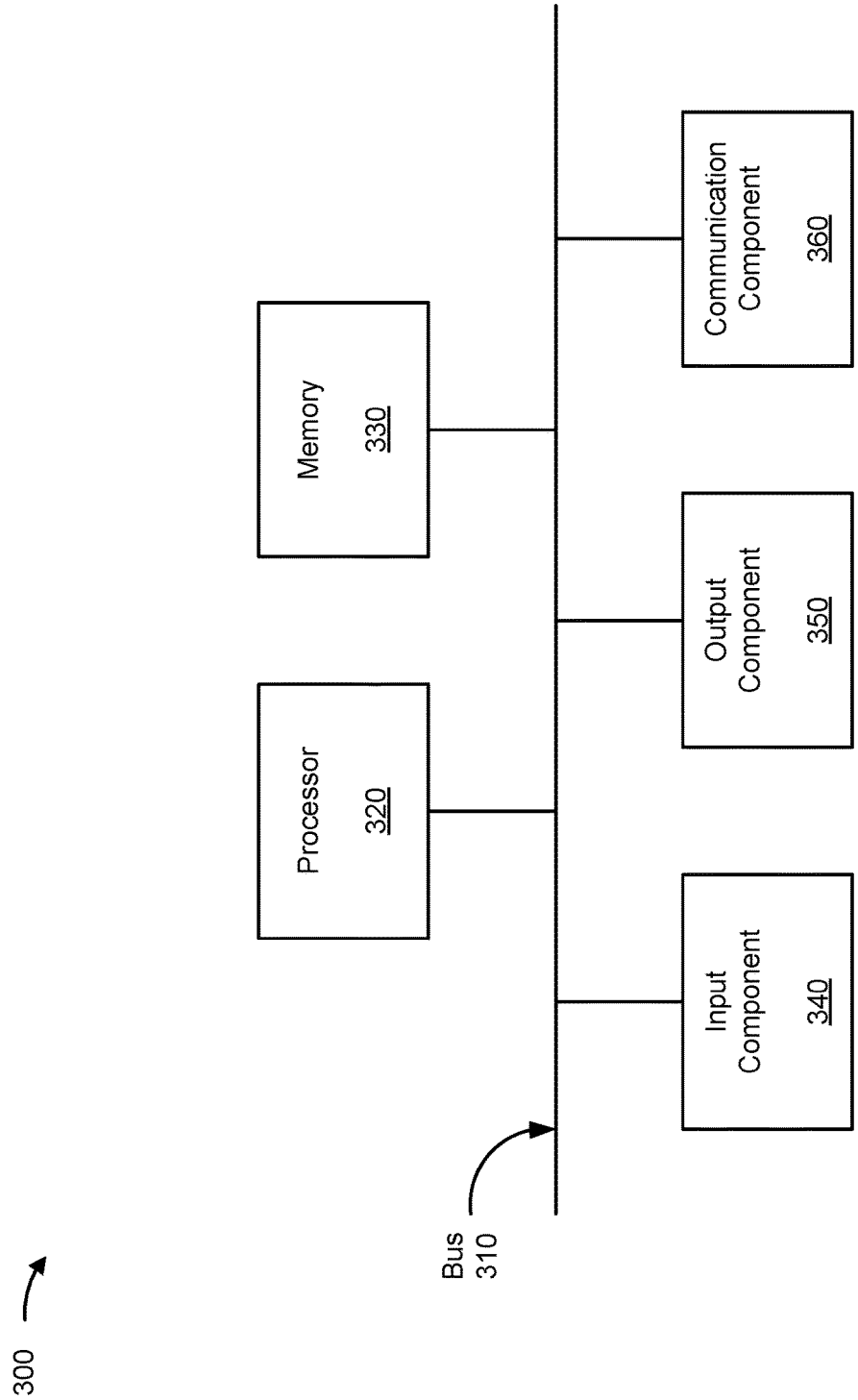
FIG. 3 is a diagram of example components of a device associated with timing alignment for data structure read commands.

FIG. 3 is a diagram of example components of a device 300 associated with timing alignment for data structure read commands. The device 300 may correspond to host device 102, embedded component 104, and/or FPGA 200. In some implementations, host device 102, embedded component 104, and/or FPGA 200 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
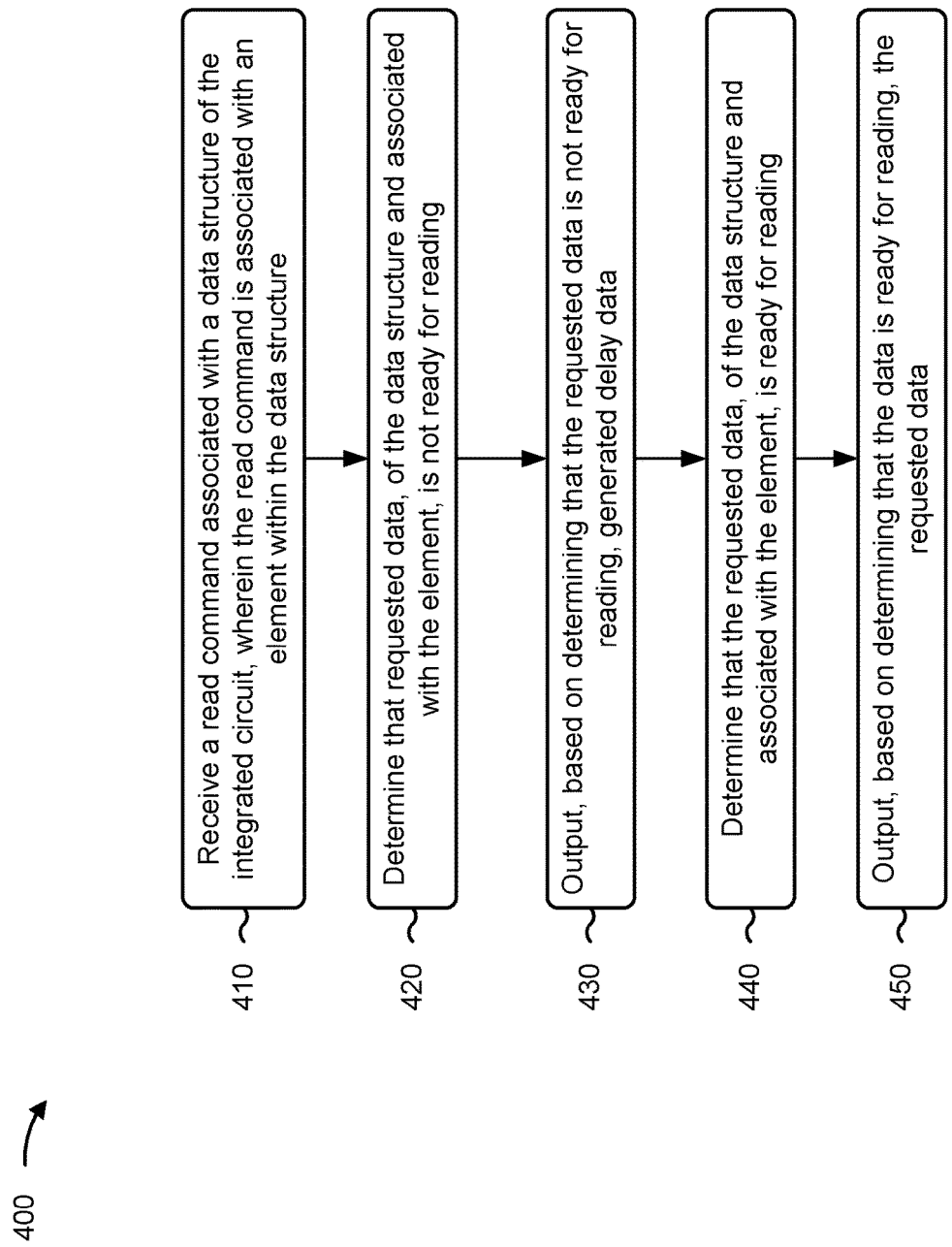
FIG. 4 is a flowchart of an example process associated with timing alignment for data structure read commands.

FIG. 4 is a flowchart of an example process 400 associated with timing alignment for data structure read commands. In some implementations, one or more process blocks of FIG. 4 are performed by an FPGA (e.g., embedded component 104 or FPGA 200). In some implementations, one or more process blocks of FIG. 4 are performed by another device or a group of devices separate from or including the FPGA, such as a host device (e.g., the host device 102). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a read command associated with a data structure of the integrated circuit, wherein the read command is associated with an element within the data structure (block 410). For example, the FPGA may receive a read command associated with a data structure of the integrated circuit, wherein the read command is associated with an element within the data structure, as described above.

As further shown in FIG. 4, process 400 may include determining that requested data, of the data structure and associated with the element, is not ready for reading (block 420). For example, the FPGA may determine that requested data, of the data structure and associated with the element, is not ready for reading, as described above.

As further shown in FIG. 4, process 400 may include outputting, based on determining that the requested data is not ready for reading, generated delay data (block 430). For example, the FPGA may output, based on determining that the requested data is not ready for reading, generated delay data, as described above.

As further shown in FIG. 4, process 400 may include determining that the requested data, of the data structure and associated with the element, is ready for reading (block 440). For example, the FPGA may determine that the requested data, of the data structure and associated with the element, is ready for reading, as described above.

As further shown in FIG. 4, process 400 may include outputting, based on determining that the data is ready for reading, the requested data (block 450). For example, the FPGA may output, based on determining that the data is ready for reading, the requested data, as described above.

Process 400 may include additional implementations, such as any single implementation or any combination of implementations described below and/or in connection with one or more other processes described elsewhere herein.

In a first implementation, the integrated circuit is a field programmable gate array.

In a second implementation, alone or in combination with the first implementation, the data structure is a dynamic data structure.

In a third implementation, alone or in combination with one or more of the first and second implementations, the element is a register location.

In a fourth implementation, alone or in combination with one or more of the first through third implementations, process 400 includes determining an amount of requested data to read from the data structure based at least in part on a value associated with the element within the data structure.

In a fifth implementation, alone or in combination with one or more of the first through fourth implementations, determining that the requested data is not ready for reading comprises determining that the requested data is not ready for reading based at least in part on determining the amount of requested data to read from the data structure.

In a sixth implementation, alone or in combination with one or more of the first through fifth implementations, process 400 includes switching the multiplexer from a first state in which the delay data is output to a second state in which the requested data is output, and outputting the requested data comprises outputting the requested data based on switching the multiplexer from the first state to the second state.

In a seventh implementation, alone or in combination with one or more of the first through sixth implementations, the delay data includes a set of values, configured to be read as delay data, corresponding to the element of the data structure.

In an eighth implementation, alone or in combination with one or more of the first through seventh implementations, the delay data includes an instruction to re-read the set of values.

In a ninth implementation, alone or in combination with one or more of the first through eighth implementations, the delay data includes a linked collection of data elements.

In a tenth implementation, alone or in combination with one or more of the first through ninth implementations, the delay data includes readable data associated with another read command.

In an eleventh implementation, alone or in combination with one or more of the first through tenth implementations, process 400 includes outputting a first portion of the requested data, and determining to delay providing a second portion of the requested data, wherein outputting the delay data comprises outputting the delay data to delay providing the second portion of the requested data, and wherein outputting the requested data comprises outputting the second portion of the requested data.

In a twelfth implementation, alone or in combination with one or more of the first through eleventh implementations, the delay data includes a delay timing indicator of a period of delay time, and outputting the requested data comprises outputting the requested data after the period of delay time.

In a thirteenth implementation, alone or in combination with one or more of the first through twelfth implementations, the delay data includes a first portion of delay data and a second portion of delay data, and the second portion of delay data indicates a repetition of reading the first portion of delay data.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by an integrated circuit, a read command associated with a data structure of the integrated circuit;
   determining, by the integrated circuit, that requested data, of the data structure and associated with an element within the data structure, is not ready for reading;
   outputting, by a multiplexer of the integrated circuit and based on determining that the requested data is not ready for reading, generated delay data comprising an indicator indicating a next chunk of data to be read;
   determining, by the integrated circuit, that the requested data, of the data structure and associated with the element, is ready for reading; and
   outputting, by the multiplexer of the integrated circuit and based on determining that the data is ready for reading, the next chunk of data, wherein the next chunk of data comprises the requested data.

2. The method of claim 1, further comprising:
   determining an amount of requested data to read from the data structure based at least in part on a value associated with the element within the data structure.

3. The method of claim 2, wherein determining that the requested data is not ready for reading comprises:
   determining that the requested data is not ready for reading based at least in part on determining the amount of requested data to read from the data structure.

4. The method of claim 1, further comprising:
   switching the multiplexer from a first state in which the delay data is output to a second state in which the next chunk of data is output; and
   wherein outputting the next chunk of data comprises:
      outputting the next chunk of data based on switching the multiplexer from the first state to the second state.

5. The method of claim 1, further comprising:
   outputting a first portion of the requested data; and
   determining to delay providing a second portion of the requested data; and
      wherein outputting the delay data comprises:
         outputting the delay data to delay providing the second portion of the requested data; and
      wherein the next chunk of data comprises the second portion of the requested data.

6. The method of claim 1, wherein the delay data includes a delay timing indicator of a period of delay time, and
   wherein outputting the next chunk of data comprises:
      outputting the requested data-next chunk of data after the period of delay time.

7. A field programmable gate array (FPGA), comprising:
   one or more memories; and
   one or more processing components, coupled to the one or more memories, configured to:
      receive a read command associated with a data structure of the FPGA;
      determine that requested data, associated with an element within the data structure, is not ready for reading;
      output, based on determining that the requested data is not ready for reading, generated delay data comprising an indicator indicating a next chunk of data to be read;
      determine that the requested data, of the data structure and associated with the element, is ready for reading; and
      output, based on determining that the data is ready for reading, the next chunk of data, wherein the next chunk of data comprises the requested data.

8. The FPGA of claim 7, wherein the one or more processing components are further configured to:
   switch a multiplexing component between outputting, to an output component, a first data stream, which includes the requested data, and a second data stream, which includes the delay data.

9. The FPGA of claim 7, wherein the data structure is a dynamic data structure.

10. The FPGA of claim 7, wherein the element is a register location.

11. The FPGA of claim 7, wherein the delay data includes:
   a set of values, configured to be read as delay data, corresponding to the element of the data structure.

12. The FPGA of claim 11, wherein the delay data includes:
   an instruction to re-read the set of values.

13. The FPGA of claim 7, wherein the delay data includes a linked collection of data elements.

14. The FPGA of claim 7, wherein the delay data includes readable data associated with another read command.

15. The FPGA of claim 7, wherein the delay data includes a first portion of delay data and a second portion of delay data, and
   wherein the second portion of delay data indicates a repetition of reading the first portion of delay data.

16. A host device, comprising:
one or more memories; and
one or more processors, coupled to the one or more memories, configured to:
  transmit a read command associated with a data structure of an integrated circuit, wherein the read command is associated with an element within the data structure;
  receive first data as a response to the read command, the first data including generated delay data comprising an indicator indicating second data to be read;
  read the first data based on receiving the first data;
  determine, based on reading the first data, that the first data is the delay data;
  delay performing a processing action in connection with the read command based on determining that the first data is the delay data; and
  receive the second data, after receiving the first data, as another response to the read command, wherein the second data comprises requested data associated with the element within the data structure.

17. The host device of claim 16, wherein the one or more processors are further configured to:
  determine that the second data is the requested data associated with the element within the data structure; and
  perform the processing action in connection with the read command based on determining that the second data is the requested data associated with the element within the data structure.

18. The host device of claim 16, wherein the one or more processors are further configured to:
  initiate a startup sequence; and
  wherein the one or more processors, when configured to transmit the read command, are configured to:
    transmit the read command based on initiating the startup sequence.

19. The host device of claim 16, wherein the delay data includes:
  a set of values, configured to be read as delay data, corresponding to the element of the data structure.

20. The host device of claim 19, wherein the delay data includes an instruction to re-read the set of values; and
  wherein the one or more processors, when configured to read the first data, are configured to:
    read a plurality of instances of the first data.

* * * * *

UNITED STATES PATENT AND TRADEMARK OFFICE
CERTIFICATE OF CORRECTION

PATENT NO. : 12,265,708 B2
APPLICATION NO. : 18/342131
DATED : April 1, 2025
INVENTOR(S) : Milton et al.

Page 1 of 1

It is certified that error appears in the above-identified patent and that said Letters Patent is hereby corrected as shown below:

In the Claims

Claim 6:
Column 12, Line 22, change "outputting the requested data-next chunk of data after" to --outputting the next chunk of data after--

Signed and Sealed this
Sixteenth Day of September, 2025

Coke Morgan Stewart
*Acting Director of the United States Patent and Trademark Office*